UNITED STATES PATENT OFFICE 2,591,668

PREPARATION OF PHENYL SILICON TRICHLORIDE

Arthur J. Barry, Midland, Lee De Pree, Holland, and Donald E. Hook, Midland, Mich., assignors to The Dow Chemical Company, Midland, Mich., a corporation of Delaware No Drawing. Application November 4, 1947, Serial No. 784,076

3 Claims. (Cl. 260—448.2)

The present invention relates to the preparation of phenyl silicon trichloride from benzene and trichlorosilane (HSiCl₃), also called silicochloroform.

There has been described in the literature the preparation of phenyl silicon trichloride from benzene and trichlorosilane by interacting these two materials at elevated temperature in vapor phase. The reaction was conducted at atmospheric pressure. In this type of process, phenyl silicon trichloride is not produced at temperatures of 500° C. and below. A yield of 8% has been obtained by operating at a temperature of around 650° C.

We have shown in our copending application Serial Number 674,925 that olefins may be reacted with trichlorosilane to produce alkyl trichlorosilanes. We have also shown in our application Serial Number 674,926, now U. S. Patent 2,510,853, that olefins may be reacted with alkyldichlorosilanes (RHSiCl₂) to produce dialkyldichlorosilanes and that benzene may be reacted therewith to produce alkylphenyldichlorosilanes. The processes which we have disclosed in these applications are conducted under pressure.

Objects of the present invention are to provide improved methods for effecting interaction of benzene and trichlorosilane.

In accordance with the present invention, benzene is interacted with trichlorosilane at a temperature and under a pressure above the critical temperature and critical pressure of either of the reactants. Although little is known of the phase conditions of materials above their critical temperature and pressure, it has been theorized that some form of condensed phase is present. Under the conditions of operation of the present process there appears to be a condensed phase present of this character. Under these conditions phenyl trichlorosilane is obtained.

The critical temperature of benzene is 288.5° C. and the critical pressure thereof is 703 pounds per square inch. The critical temperature and pressure of silicochloroform are less than those of benzene. Accordingly, the process hereof is conducted at a temperature above 288.5° C. and a pressure above 703 pounds per square inch. Preferred operation involves conducting the process hereof at a temperature between 350° C. and 500° C. in which range good yields of phenyl silicon trichloride are obtained. Rates of reaction are too low at temperatures below 350° C. to be of substantial commercial importance. In general temperatures above 500° C. are not preferred due to engineering difficulties involved in such an operation under the pressures employed in accordance herewith.

Inasmuch as the reaction of the present invention proceeds with the consumption of one mol of benzene per mol of silicochloroform, it is preferred to operate with equimolar ratios of the two. The present process, however, may be conducted with an excess of either of the reactants present. It is preferred, based upon economics and the laws of mass action, to have less than 10 mols of either of the reactants per mol of the other reactant.

A convenient method for conducting the present reaction is to charge the reactants into a pressure autoclave, whereby the reactants are confined within a constant volume during heating and interaction. When the temperature reaches 288.5° C., the pressure will be found to be above 703 pounds per square inch, the critical pressure of benzene. The reaction hereof then proceeds at a low rate. Upon increase of the temperature to above 350° C., the rate of reaction increases. At any given temperature the rate will gradually decrease with increasing time as is normally expected due to consumption of reagents. The reaction may be terminated at any desired time considering the economic balance of costs and yield.

Any other equipment may be employed for conducting the process hereof in which it is possible to obtain the temperatures and pressures indicated.

Example 1

1402 grams of benzene and 2440 grams of trichlorosilane were introduced into a pressure autoclave of 14.4 liters capacity. The bomb was then heated to a temperature of 353° C. for 16 hours. A maximum pressure of 1200 pounds per square inch was attained. The contents of the autoclave were discharged and distilled. A yield of 48 grams of phenyltrichlorosilane was thereby obtained.

Example 2

The pressure autoclave described in Example 1 was charged again with the same amounts of benzene and trichlorosilane. The autoclave was then heated at 425° C. for 16 hours. A maximum pressure of 1800 pounds per square inch was attained. The contents of the autoclave were discharged and distilled. A yield of 788 grams of phenyltrichlorosilane and 115 grams of phenyldichlorosilane ($C_6H_5SiHCl_2$) was obtained. Together these represent a 25 percent yield of phenylchlorosilanes.

Example 3

A present autoclave of 2.4 liters capacity was charged with a mixture containing equimolar amounts of benzene and trichlorosilane. The autoclave was then heated at 500° C. for 10 hours. A maximum pressure of 1720 pounds per square inch was obtained. Upon discharging the autoclave a total of 421 grams of discharged material was recovered. This was distilled and thereby gave a yield of 91 grams of phenyl silicon trichloride.

That which is claimed is:

1. The method of producing phenyl trichlorosilane which comprises reacting benzene with trichlorosilane at a temperature above the critical temperature of benzene and at a pressure above the critical pressure of benzene whereby interaction is obtained with the production of phenyl silicon trichloride.

2. The method of producing phenyl silicon trichloride which comprises reacting benzene with trichlorosilane at a temperature between 350° and 500° C. at a pressure above the critical pressure of benzene whereby interaction is obtained with the production of phenyl silicon trichloride.

3. The method of producing phenyl silicon trichloride which comprises reacting benzene with trichlorosilane at a temperature between 350° C. and 500° C. at a pressure above the critical pressure attained by heating a mixture thereof under conditions of constant volume, whereby interaction is obtained with the production of phenyl silicon trichloride.

ARTHUR J. BARRY.
DONALD E. HOOK.
LEE DE PREE.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 31, 1946 |
| 2,407,181 | Scott | Sept. 3, 1946 |
| 2,443,898 | Ellingboe | June 22, 1948 |